United States Patent [19]
Kendall

[11] Patent Number: 5,829,935
[45] Date of Patent: Nov. 3, 1998

[54] FASTENING ARRANGEMENT

[75] Inventor: Donald H. Kendall, Almont, Mich.

[73] Assignee: The United States of America as represented by the Secretary of the Army, Washington, D.C.

[21] Appl. No.: 854,630

[22] Filed: May 12, 1997

[51] Int. Cl.⁶ ..................................................... F16B 25/00
[52] U.S. Cl. ............................ 411/387; 411/399; 411/415
[58] Field of Search ..................................... 411/386, 387, 411/399, 383, 411, 415; 52/410

[56] References Cited

U.S. PATENT DOCUMENTS

| | | | |
|---|---|---|---|
| 3,478,639 | 11/1969 | Gruca | 411/415 |
| 3,500,713 | 3/1970 | Bell | 411/387 |
| 4,862,664 | 9/1989 | Romine | 411/387 |
| 4,881,861 | 11/1989 | Hewison | 411/387 |
| 4,959,938 | 10/1990 | De Caro | 411/399 |
| 5,449,257 | 9/1995 | Giannuzzi | 411/387 |

FOREIGN PATENT DOCUMENTS 285397  6/1980  Germany ............................... 411/387

*Primary Examiner*—Flemming Saether
*Attorney, Agent, or Firm*—Peter A. Taucher; David L. Kuhn

[57] ABSTRACT

A fastener assembly connects two layers of different hardness in a panel. The assembly has a screw and has a mechanism for boring through the softer layer comprised of a collar of material softer than the material of the screw. The screw is tapped into the collar and has a bit for boring through the harder layer of the panel. The screw's head fits into the collar so that the screw and collar can be countersunk together into the softer layer of the panel. The collar has a lead end having a leading cutting edge for drilling into the softer layer of the panel. The collar also has a trailing end having a frustoconical skirt on which is located a trailing cutting edge. The torque to rotate the screw in the collar is greater than a torque to rotate the collar in the softer layer of the panel. But the torque to rotate the screw in the collar is less than the torque to rotate the screw in the harder layer of the panel.

7 Claims, 3 Drawing Sheets

FASTENING ARRANGEMENT

GOVERNMENT USE

The invention described here may be made, used and licensed by or for the U.S. Government for governmental purposes without paying me any royalty.

BACKGROUND AND SUMMARY

Freight bearing vehicles will often have a layer of wood covering a metal frame or subfloor of a cargo deck. Typically, such vehicles have a metal frame or wall supporting panels of wood or other material softer than the metal frame or wall. Attaching the panels of wood to a cargo deck or to an upright frame or wall is facilitated by the use of special fasteners. My invention is a fastener assembly especially adapted to attach softer panels to harder panels or to frame members. The fastener assembly attaches the softer panel in a smooth, continuous drilling action that facilitates quick fabrication of decks or upright panels having multiple layers.

My fastener assembly includes a self tapping screw which has threads of varying coarseness on its shank. The coarsest threads are nearest the head of the screw, the finest threads are nearest a bit at the tip of the screw, and threads of intermediate coarseness are between the coarsest and finest threads. The screw and its bit are the means for boring through the harder layer of a panel, which lies behind or beneath the softer layer. Before the screw drives through the harder layer, a collar of the fastener assembly bores through the softer layer. The collar is a generally cylindrical body into which the screw taps. The collar is of material softer than the screw but harder than the material of the softer layer. The collar has two cutting edges. One cutting edge is at the lead end of the collar, which enters the softer layer first. The other cutting edge is at the trailing end of the collar on a flared, frustoconical skirt. The skirt can be countersunk into the softer layer and the skirt receives the screw's head so that the head can become flush with the softer layer.

The strength of the tapped connection between the screw and collar is specially selected, this strength depending on the hardness of the harder layer and softer layer. This strength meets two conditions. First, the torque to rotate the screw relative to the collar is greater than a torque to rotate the collar in the softer layer of the panel. Second, the torque to rotate the screw relative to the collar is less than the torque to rotate the screw in the harder layer of the panel.

DETAILED DESCRIPTION

Figure 1:
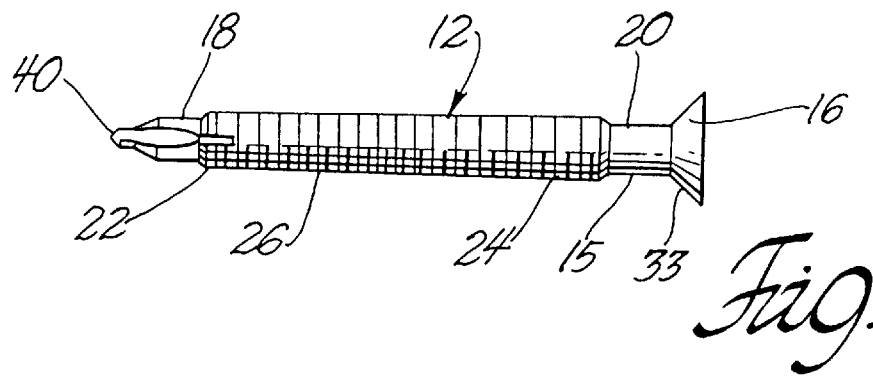
FIG. 1 shows the self tapping screw of my assembly.
Figure 4:
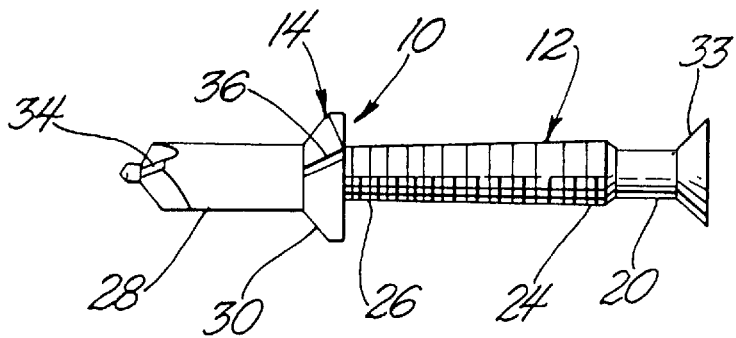
FIG. 4 shows the assembly wherein the screw is tapped into the collar.

In FIG. 4 is clamping screw assembly 10, which comprises a self tapping screw 12 and a sleeve 14. As seen in FIG. 1, screw 12 has tapered head 16, a bit 18 and shank 20 therebetween. Screw 12 has finest threads 22 adjacent bit 18, coarsest threads 24 next to unthreaded shank portion 15 and threads 26 of intermediate coarseness between threads 22 and threads 24.

Figure 2:
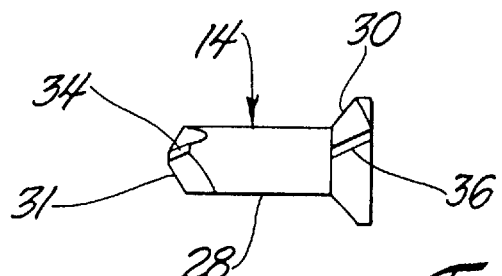
FIG. 2 is an elevational view of a collar of my assembly.
Figure 3:
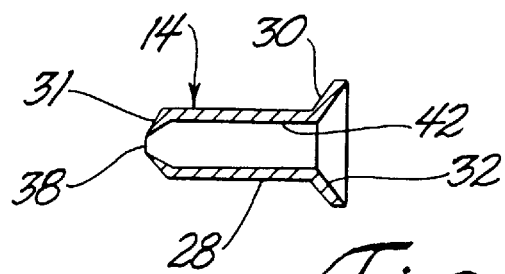
FIG. 3 is a sectioned view of the collar.

FIGS. 2 and 3 show collar 14, which is made of a steel or other metal softer than the steel of screw 12. Collar 14 has a hollow, generally cylindrical body 28 having a frustoconical skirt 30 integrally formed therewith at the trailing end of the collar. The collar also has a tapered lead portion 31 integrally formed therewith at the leading end of the collar. As shown by FIG. 3, lead portion 31 defines a central aperture 38 through which the tip 40 of bit 18 passes when screw 12 is inserted into collar 14. An internal peripheral surface 32 of skirt 30 mates congruently with bevel surface 33 of screw head 16, so that head 16 can be countersunk into skirt 30. Lead portion 31 has leading cutting edge 34 and skirt 30 has a trailing cutting edge 36, both edges shaped essentially like a cutting edge of a drill bit.

When screw 12 is rotatingly driven or screwed into collar 14, the threads of screw 12 tap internal cylindrical surface 42 (FIG. 3) of the collar. Screw 12 is so driven until tip 40 protrudes through lead portion 31 of the collar, as shown in FIG. 4. Deck clamping screw assembly 10 is now ready for use.

Figure 5:
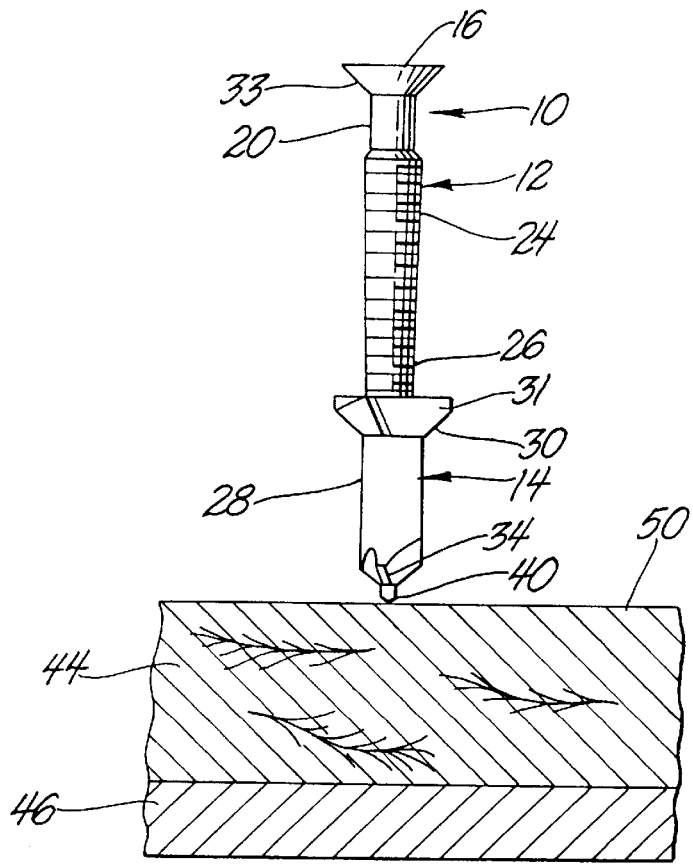
FIG. 5 shows my fastener assembly just before the assembly begins piercing the softer layer.

Assembly 10 is oriented vertically on a deck or other panel as shown in FIG. 5. The deck is comprised of a softer layer 44 and a harder layer 46, the softer layer typically being wood and the harder layer typically being steel. The respective layers can, of course be made of materials other than wood and steel. Screw 12 is now rotatingly driven into softer layer 44, and collar 14 is carried by screw 12 so that collar 14 is screwed into softer layer 44.

Collar 14 is harder and stronger than layer 44, and there is a preselected minimum strength of the tapping engagement between the collar and screw 12. These two features prevent relative motion between screw 12 and collar 14 as screw 12 and collar 14 are driven into softer layer 44. Stated another way, screw 12 carries collar 14 through layer 44 because the torque required to tap screw 12 further into collar 14 is greater than the torque needed to drive collar 14 through layer 44. There is increasing coarseness of threads on screw 12 from points more distal from head 16 to points more proximal to head 16. This increasing coarseness is another feature of the tapping engagement that now prevents relative motion between screw 12 and collar 14.

Figure 6:
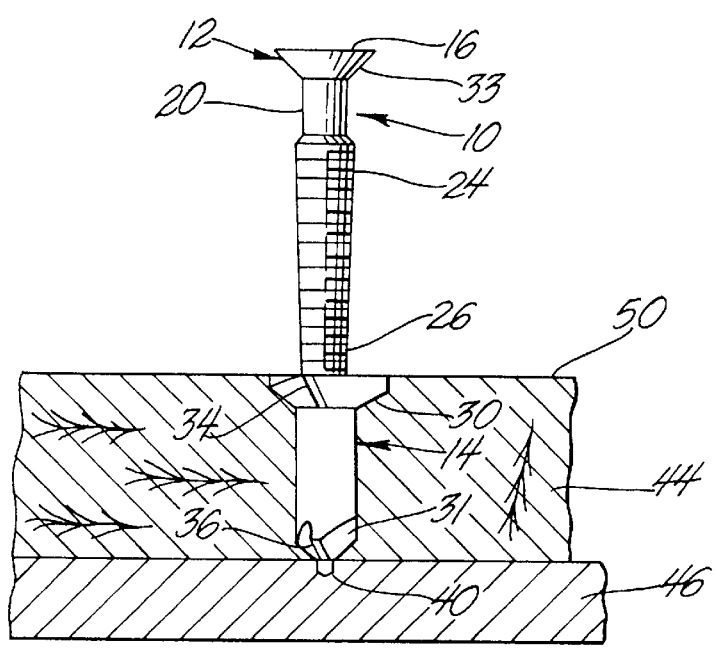
FIG. 6 shows my fastener assembly when the collar has bored into the softer layer and has stopped at the harder panel.
Figure 7:
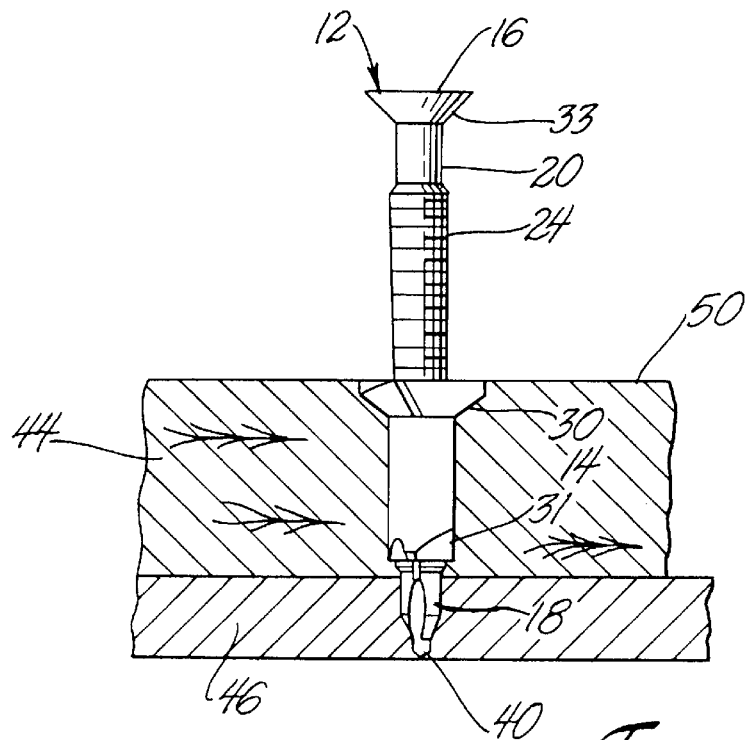
FIG. 7 shows my fastener assembly wherein the collar has stopped at the border of the harder layer but the screw continues into the harder layer.

Screw 12 continues to be driven until collar 14 contacts harder layer 46, as shown in FIG. 6. Here, collar 14 stops while screw 12 continues being driven, as shown in FIG. 7. Screw 12 at this time acts as a drill bit—it rotates and moves axially downward relative to collar 14. Since collar 14 is softer than layer 46, and due to the selected maximum strength of the tapping engagement between the collar and screw 12, there occurs relative motion between screw 12 and collar 14 as screw 12 is driven into harder layer 46. That is, the torque required to tap screw 12 further into collar 14 is less than the torque needed to drive collar 14 through layer 46.

The length of collar 14 may be the same as the thickness of softer layer 44, so when lead portion 31 of collar 14 contacts harder layer 46, skirt 30 is even with exposed surface 50 of softer layer 44, as seen in FIG. 7. In the FIG. 7 configuration, it will be seen that the resistance of layer 44 to the advance of skirt 30 and the resistance of layer 46 to the advance of lead portion 31 act simultaneously to thwart the further penetration of collar 14 into the deck.

Figure 8:
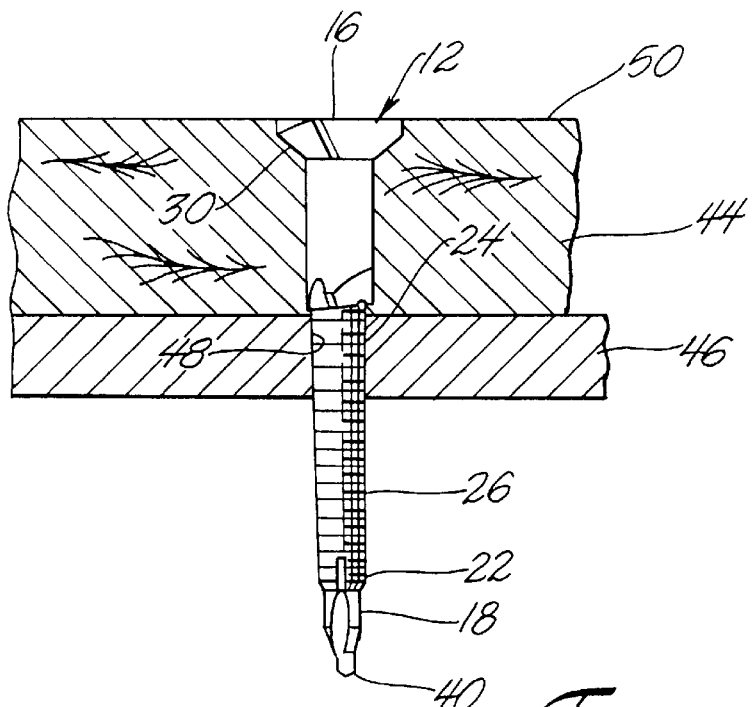
FIG. 8 shows my fastener after the screw is fully drilled or screwed into the panel.

Screw 12 continues to drill and tap through collar 14 and harder layer 46, until screw 12 reaches its FIG. 8 position. There, head 16 of screw 12 mates with internal peripheral surface 32 of the collar's skirt 30 and the top of head 16 is flush with the exposed surface 50 of softer layer 44. As screw 12 approaches the FIG. 8 position, increasingly coarser threads of screw 12 bite against the sides of tapped hole 48 in harder layer 48. When screw 12 reaches its final, FIG. 8 position, coarsest threads 24 of screw 12 bite against the sides of tapped hole 48. It may be preferred that the mean diameter of shank 20 is greater than the inner diameter of cylindrical body 28 of collar 14, at least in the zone of shank 20 nearest head 16. Because of the relatively larger diameter of shank 20, an interference fit exists between screw 12 and collar 14 in the FIG. 8 position, whereby collar 14 is radially expanded by insertion of screw 12. Consequently, collar 14 fits more tightly and securely with softer layer 44 than would otherwise be the case.

I do not desire to be limited to the exact details of construction or method shown herein since obvious modifications will occur to those skilled in the relevant arts without departing from the spirit and scope of the following claims.

What is claimed is:

1. A structure comprising:

one layer of a panel;

another layer of the panel, the other layer harder than the one layer and adjacent thereto;

a fastener assembly securing the layers together;

a self tapping screw of the fastener assembly;

a tapered head of the screw;

a shank of the screw attached to the head;

coarsest threads on the shank;

finest threads on the shank;

intermediate threads on the shank between the finest threads and the coarsest threads, the intermediate threads less coarse than the coarsest threads and less fine than the finest threads;

a bit on the screw at an opposite end of the screw from the head;

means in the assembly for boring through the softer layer comprising a collar of material softer than the material of the screw;

a generally cylindrical body of the collar;

a frustoconical skirt at a trailing end of the collar integrally adjacent the cylindrical body;

a tapered lead portion of the collar at a leading end of the collar, the lead portion defining an aperture;

a leading cutting edge on the lead portion of the collar; and a trailing cutting edge on the skirt;

wherein the screw is tapped into the collar, a torque to rotate the screw relative to the collar is greater than a torque to rotate the collar in the softer layer of the panel, and the torque to rotate the screw relative to the collar is smaller than the torque to rotate the screw in the harder layer of the panel.

2. The assembly of claim 1 wherein the length of the collar is equal to the depth of the softer layer of the panel.

3. The assembly of claim 1 wherein a mean diameter of the shank is greater than an internal diameter of the cylindrical body.

4. A structure comprising:

one layer of a panel;

another layer of the panel, the other layer harder than the one layer;

a fastener assembly connecting the layers;

a screw of the fastener assembly;

means in the assembly for boring through the softer layer, the boring means comprising a collar of material softer than the material of the screw;

a skirt at a trailing end of the collar;

a lead portion of the collar at a leading end thereof;

a leading cutting edge on the lead portion of the collar;

a trailing cutting edge on the skirt;

wherein the screw is tapped into the collar so as to have a direct drive connection therewith, and a torque to rotate the screw relative to the collar is greater than a torque to rotate the collar in the softer layer of the panel.

5. The assembly of claim 4 wherein the torque to rotate the screw relative to the collar is smaller than the torque to rotate the screw in the harder layer of the panel.

6. The assembly of claim 4 wherein the screw is a self tapping screw comprised of a shank, coarsest threads on the shank, finest threads on the shank and intermediate threads on the shank between the finest threads and the coarsest threads, and wherein the intermediate threads are less coarse than the coarsest threads and less fine than the finest threads.

7. A structure comprising:

one layer of a panel;

another layer of the panel, the other layer harder than the one layer;

a fastener assembly connecting the layers;

a screw of the assembly;

means of the assembly for boring through the softer layer comprised of a collar of material softer than the material of the screw;

wherein the collar further comprises a lead portion of the collar at a leading end thereof, a leading cutting edge on the lead portion of the collar, a skirt at a trailing end of the collar and a trailing cutting edge on the skirt;

means for boring through the harder layer comprised of a bit on the screw;

wherein the screw is tapped into the collar, and a torque to rotate the screw relative to the collar is greater than a torque to rotate the collar in the softer layer; and wherein the torque to rotate the screw relative to the collar is smaller than the torque to rotate the screw in the harder layer.

* * * * *